United States Patent Office 3,152,752
Patented Oct. 13, 1964

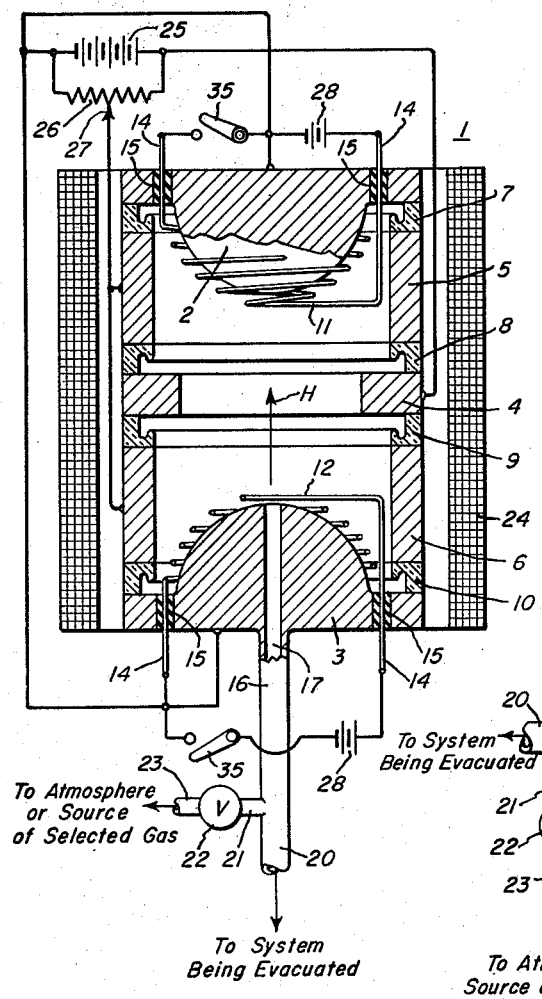
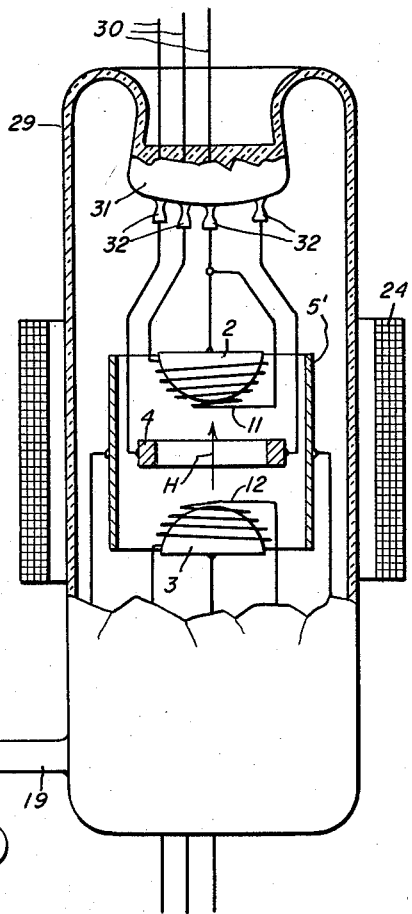
Fig. 1.
Fig. 2.
To System Being Evacuated
To Atmosphere or Source of Selected Gas
To System Being Evacuated
To Atmosphere or Source of Selected Gas
Inventor:
Thomas A. Vanderslice,
by Joseph V. Claeys
His Attorney.

3,152,752
APPARATUS AND METHOD OF REMOVING ORGANIC VAPORS FROM LOW PRESSURE VACUUM SYSTEMS
Thomas A. Vanderslice, Scotia, N.Y., assignor to General Electric Company, a corporation of New York
Filed Apr. 30, 1962, Ser. No. 190,906
10 Claims. (Cl. 230—69)

This invention relates generally to apparatus for lowering the pressure of evacuated systems to extremely low values and more particularly to apparatus and to a method for continuously removing organic vapors from such systems.

Ionic pumps, such as the "diode-type" disclosed and claimed in Patent No. 2,755,014, Westendorp et al. and the improved "triode-type" disclosed and claimed in my copending application Serial No. 763,293, filed September 25, 1958, now Patent No. 3,080,104 and assigned to the assignee of the present invention, are extremely useful in removing gases from low pressure vacuum systems. Although such ionic pumps are of great utility and function satisfactorily in removing chemically active as well as inert gases from vacuum systems in order to obtain extremely low pressures therein, they have heretofore been unable to remove any but minute quantities of organic vapors, particularly of the heavier molecular weight organic compounds such as benzene, toluene, etc.

Accordingly, it is an object of this invention to provide improved ionic pumps in which organic vapors may be continuously removed from low pressure vacuum systems.

It is another object of this invention to provide a novel ionic pump which is capable of performing in an improved manner the functions of producing high vacua in a system containing organic vapors or of maintaining high vacua in a sealed-off system in which organic vapors are present or are gradually evolved.

It is still another object of this invention to provide a method of achieving extremely low pressures in vacuum systems containing organic vapors.

I have found that the failure to pump organic vapors is due to the contamination of the metallic sputtering members of the apparatus by the deposition thereon of a carbonaceous layer. This carbonaceous layer may deposit on the electrodes of the ionic pump and particularly on the cathodes, or other metal sputtering electrodes of the ionic pumping apparatus, causing such a serious reduction in the quantity of sputtered metal therefrom that the normal removal of ionized gas molecules by sorbtion or covering up of such ionized gas molecules by sputtered metal ceases. Moreover, once this layer has formed, and the normal removal of gases by sputtered metal ceases, the high voltage discharge, or other gas ionizing means, of the ionic pumping apparatus acts to dissociate the higher molecular weight organic vapor into lower molecular weight species thereof and the pressure within the pump, and system, may be caused to increase.

I have discovered that controllably admitting a non-contaminating gas, such as air, oxygen, or an inert gas, into the pump volume during pumping of organic vapors, preferably at a rate about equal to the rate at which the organic vapors are introduced into the pump volume, prevents excessive deposition of the contaminating carbonaceous layer so that the sputtering action of the ionic pump is continuously maintained in the presence of such vapors. By maintaining the production of sputtered metal in the ionic pumping apparatus during operation in an organic vapor containing atmosphere, organic vapors may be removed by normal pumping action. For example, such vapors may be removed by ions thereof being embedded into the cathodes, such as described in Patent No. 2,775,014, or by being covered up by sputtered metal as described in my above-referenced copending application, Serial No. 763,293; both of which mechanisms depend upon the continued production of sputtered metal.

As used throughout the specification and in the appended claims the term "noncontaminating gas" refers to an atomic or molecular gas which neither itself nor its decomposition products forms deposits which have a high electrical resistance or are difficult to sputter by impinging high velocity ions. Some examples of such gases are air, oxygen, nitrogen and the noble gases.

I have further discovered that such an ionic pumping apparatus may be reactivated after the formation of the contaminating carbonaceous layer, which essentially causes a cessation of metallic sputtering therein, by controllably admitting to the pump volume during operation of the pump a chemically active gas, preferably oxygen or air. Although the exact mechanism by which this is accomplished is not fully understood, it is believed that the chemically active gas atoms and ions, formed in the high voltage discharge, or other gas ionizing means, of the pump, react with the carbonaceous deposit on the cathodes, or other metal sputtering members of the pump, forming volatile gases which may be removed by normal pump action.

Briefly stated, in accordance with one aspect of this invention, I provide an ionic pump of the type including an evacuable enclosure having therein means for causing the ionization of gas molecules within the pump volume, means for sputtering metallic particles from selected pump members, and means operative in conjunction with the metallic particles so sputtered for removing the ionized gas molecules. The invention further comprises, in combination with such a pump, means operatively connected thereto for controllably admitting a noncontaminating gas into the pump volume to maintain metallic sputtering from the selected pump members in the continued presence of organic vapors so that extremely low pressures may be obtained, or maintained, in vacuum systems containing such organic vapors.

Further, in another aspect of the invention for reactivating an already contaminated apparatus, a chemically active gas, such as air or oxygen, is admitted to the evacuated enclosure, or the system, during operation of the ionic pumping apparatus to remove deposited carbonaceous material from the operating members of the apparatus and restore the production of sputtered metal therein so that ionized gas molecules may again be removed by the sputtered metal.

The novel features believed characteristic of this invention are set forth particularly in the appended claims. The invention itself, together with further objects and advantages thereof, may best be understood by reference to the following description taken in conjunction with the accompanying drawing in which:

FIGURE 1 is a vertical cross-sectional view of an ionic pump incorporating the principles of the present invention, and FIGURE 2 is a partially-sectioned vertical view of a modification of the apparatus of FIGURE 1.

The present invention will be described in detail herein with particular reference to the illustrative embodiment of a "triode-type" ionic pump of the type disclosed and claimed in my copending application Serial No. 763,293 shown in FIGURE 1. It is to be understood, however, that this invention is not limited to apparatus of any particular design or configuration since the principles thereof are applicable to all such apparatus wherein ionized gas molecules are embedded into, sorbed or covered up by sputtered metal and thereby removed from the system.

In FIGURE 1, an ionic pump of the disc-seal type constructed in accord with the present invention includes substantially hemispherical cathode members 2 and 3, an apertured anode member 4 and cylindrical collector electrodes 5 and 6 juxtaposed closely adjacent to respective cathode members 2 and 3. Each of the cathode members 2 and 3 and the anode member 4 possesses an annular portion at the periphery thereof, which is of substantially the same diameter as the diameter of cylindrical electrodes 5 and 6. Adjacent electrode members are separated by insulating ceramic annular members 7, 8, 9 and 10 which are hermetically sealed to the adjacent members to cause the formation of an evacuable envelope. Thus, for example, cathode member 2 is electrically separated from and hermetically sealed to collector electrode 5 by an annular member 7, collector electrode 5 is electrically separated from and hermetically sealed to anode member 4 with annular insulating member 8. Anode member 4 is likewise electrically separated from and hermetically sealed to collector electrode 6 by annular insulating member 9 and collector electrode 6 is electrically separated from and hermetically sealed to cathode member 3 by insulating member 10.

Each of insulating members 7, 8, 9 and 10 have cross-sectional areas which define a re-entrant portion having a surface which is not in line-of-sight relationship with any active surface portion of cathodes 2 and 3. This is achieved in the device of FIGURE 1 by causing a counterbore to be cut in the annular insulating members and cutting a recessed annulus in the base of each counterbore.

Suitable thermionic filaments 11 and 12 may, if desired, be located in close juxtaposition to the hemispherical surfaces of cathodes 2 and 3. Filaments 11 and 12 may be composed of a highly electron emissive material such as tungsten wire. If thermionic filaments 11 and 12 are included, the entrance of electrical connections 14 thereto is achieved by passing these leads through suitable insulated, hermetically sealed apertures 15 in the disc-shaped portion of cathode members 2 and 3 respectively. The negative end of each filament is run at ground potential making the filament, effectively, a portion of the cathode. Access to the ion pump, suitable for connecting the device to a vacuum system, the pressure of which is to be lowered to an extremely low value, is achieved by means of tubulation 16 which is connected with an orifice 17 in one of cathode members 3.

In accordance with the present invention, means are provided, operatively connected with the pump, for controllably admitting a noncontaminating gas into the volume thereof during pumping of organic vapors. The selected gas so admitted is operative to prevent excessive deposition of carbonaceous material on the pump members, particularly on cathodes 2 and 3, so that the sputtering of metallic particles within the pump is maintained in the continued presence of organic vapors.

Although the selected gas may be admitted into the pump volume at any location desired, it is preferably admitted thereto near the region at which the organic vapors being removed from the system are introduced. To this end, the means for admitting the selected gas may be operatively associated with the tubulation 16 which is adapted for connection with the system being evacuated. In this way the organic vapors and the noncontaminating gas conveniently enter the pump volume near the same location.

Tubulation 16, therefore, is provided with a T-section having portions 19, 20 and 21. Portion 19 is adapted for connection with the pump and portion 20 is adapted for connection to the system to be evacuated. The remaining portion 21 of the T-section is provided with a valve 22, or other controlling means. A portion 23 extending from valve 22 may terminate to the atmosphere for controllably admitting air into the pump. Alternatively, the extending portion 23 may be connected to a supply of a selected gas, such as oxygen, nitrogen or a noble gas, such as argon, thereby causing the selected gas to be controllably admitted to the pump volume.

While for a great many applications, a continuously controllable means is preferred for admitting the non-contaminating gas to the pump volume, an orifice of predetermined size, such as may be provided by a pipe, tube or the like, may be provided on the pump which allows a predetermined quantity of gas to be admitted. For example, in a sealed-off system in which high vacua is to be maintained and which system contains organic vapors or in which organic vapors are evolved, the orifice of predetermined size to provide the appropriate "leak" of noncontaminating gas to the pump volume to maintain the metal sputtering action of the pump may be less expensive and preferable to the continuously controllable means.

As used throughout the specification and in the appended claims, therefore, the term "controllably admitting" is intended to cover a continuously controllable means, such as a valve or the like, as well as an orifice of predetermined size through which the noncontaminating gas may be admitted to the pump or to the system at a desired rate.

A magnetic field, substantially normal to the plane of anode number 4 and indicated schematically by arrow H, is provided by electromagnetic coil 24 to cause the electrons to traverse elongated curvilinear paths within the anode-cathode space. Alternatively, a cylindrical permanent magnet, properly dimensioned so as to slip over the cylindrical envelope formed by the metallic and ceramic members comprising ion pump 1 and properly insulated therefrom so as not to short circuit the electrodes thereof, may be utilized to provide the desired magnetic field.

Operating potentials are supplied to the various members of the pump by a unidirectional voltage source as indicated generally by battery 25 and potentiometer 26. Anode member 4 is biased positively with respect to cathode members 2 and 3 to a potential of several thousand volts. Collector electrodes 5 and 6 are biased positively with respect to cathode members 2 and 3 but negative by a value of several hundred volts with respect to anode member 4 by connection to center tap 27 on potentiometer 26.

Alternatively, a suitable alternating current voltage source may be substituted for unidirectional voltage source 25. A suitable value for the magnetic field strength, H, may be from several hundred to several thousand oersteds.

Electrode members 2 and 3 are constructed of an active metal which is a good getter for chemically active gases and which further possesses the characteristic of being readily sputtered under positive ion bombardment. Such materials include titanium, zirconium, hafnium and like materials. Likewise anode 4 is preferably constructed of such material, although, since no sputtering occurs from the anode, the anode may very well be constructed of other material. Preferably, anode 4 and collector electrodes 5 and 6, as well as cathodes 2 and 3 are composed of titanium metal so that annular insulating members 7, 8, 9 and 10 may be composed of a suitable titanium-matching ceramic as, for example, a forsterite disclosed and claimed in Patent No. 2,912,340—Pincus. Assembly may be as described in the Lafferty patent, No. 2,957,741.

Anode electrode 4 may constitute an apertured disc, as is illustrated in FIGURE 1 or may, alternatively, comprise a honeycomb structure which contains a plurality of apertures. In this respect it is only necessary that anode 4 be permeable to the majority of electrons attracted thereto from cathodes 2 and 3.

In the operation of the device of FIGURE 1, when voltages as indicated hereinbefore are applied and a relatively low pressure as, for example, below $10^{-3}$ millimeters of mercury of gas is obtained within the device, a discharge is initiated between cathodes 2 and 3 on one hand and anode 4 on the other hand. Due to the fact that the electrons emitted by cold emission from the cathodes are subjected to parallel electric and magnetic fields, the electrons approach the anode from the cathode with a helical motion. Since the anode is apertured and preferably comprises a ring, and since most of the electron flux is concentrated at the center of the device away from the periphery of the ring anode by the magnetic field, most of the electrons emitted from cathodes 2 and 3 will pass through the ring anode and will approach the opposite cathode, from which they are repelled. The electrons, therefore, oscillate back and forth between the two cathode electrodes and execute elongated curvilinear paths due to the parallel electric and magnetic field. In executing such elongated curvilinear paths, each electron has a high probability of undergoing an ionizing collision with a gaseous molecule. Eventually, however, any particular electron is collected at the anode.

Ionizing collisions between electrons and gas molecules cause the creation of positive gas ions and freed electrons which freed electrons are also accelerated in elongated curvilinear paths and may enter into ionizing collisions. Since the positive ions created by such collisions have a much greater mass than electrons, they are not caused to traverse elongated curvilinear paths due to the combined electric and magnetic fields but instead are accelerated directly toward, and strike, the nearest cathode. These collisions of high velocity ions with the cathode cause metallic particles of the cathode material to be ejected by cathodic sputtering and to enter the space between the pump walls. Due to the high current density at the point where most positive ions strike the cathode, the positive ions are generally ejected therefrom by further collisions of positive ions with the cathode.

The space within the ionic pump of FIGURE 1, therefore, is filled with a large number of positive ions and sputtered metallic particles which originate from the cathode. The ions are eventually attracted to collector electrodes 5 and 6 because these electrodes are negative with respect to the plasma and the attraction is that of an electric field. Also, sputtered metallic particles from the cathodes migrate to collector electrodes 5 and 6, not because of any electrical attraction, but because of the proximity of these electrodes to the cathode and the high probability of incidence thereupon.

Since the collector electrodes 5 and 6 are only about several hundred volts negative with respect to the plasma, the positive ions attracted to these electrodes do not impinge thereupon with sufficiently high energy to cause the material thereof to be appreciably sputtered. For example, the potential of the collector electrodes is deliberately chosen to be sufficiently negative with respect to the plasma to attract positive ions, but insufficiently negative with respect to the plasma to cause these ions to impinge upon the collector electrode with sufficient force to cause any substantial sputtering therefrom. Thus, positive ions attracted to collector electrodes 5 and 6 remain at the surface thereof until they are covered by sputtered cathode material. Once this occurs, the positive ions are completely removed from the pump volume, lowering the gas pressure therein. Concurrently, the metal sputtered upon collector electrodes 5 and 6, while covering up positive ions resting upon the surface thereof, presents a clean surface which is ready to receive further attracted positive ions.

In the manner described above, it may readily be seen that such devices function by concurrent and continued processes of attraction of positive ions to the collector electrodes and the covering of these collected positive ions by metallic particles sputtered from the cathode. Such devices, therefore, are capable of removing a large number of positive ions, even of inert gases, from a vacuum system and for pumping for great lengths of time, since the buildup of sputtered metal upon collector electrodes 5 and 6 is infinitesimal insofar as the dimensions of the device are concerned.

When the atmosphere within an ionic pump consists of organic vapors, however, the ionized gas molecules are no longer removed in accord with the foregoing continued processes. I have found that the sputtering of metallic particles eventually falls to a very low rate when the ionic pump is operated in the continued presence of organic vapors. This very low rate of sputtering is due to the excessive deposition of carbonaceous material on the cathodes, or other metal sputtering electrodes of the pump, which takes place during pump operation in the continued presence of such organic vapors. This carbonaceous material is highly insulating and difficult to sputter, both of which characteristics are operative, cumulatively, to destroy the ion pumping action of the apparatus in the presence of organic vapors. For example, the highly insulating characteristic of the material, when deposited upon an electrode from which metal is to be sputtered by impinging high velocity ions, causes the electric field due to such electrode to be reduced, thereby reducing the ion attracting ability thereof and the velocity of the impinging ions. As the deposited insulating carbonaceous material becomes thicker and thicker the field due to that electrode is further and further reduced. As a result of the reduced electric field, the velocity of the attracted ions impinging on the electrode is likewise reduced making such ions less and less effective to sputter metal. At the same time, the deposited carbonaceous material is itself more difficult to sputter than the metal of the cathodes, or other metal sputtering members of the particular apparatus. For these reasons, at least, the carbonaceous material deposit progressively increases in thickness until the amount of metal sputtered from these pump members is extremely small and the apparatus ceases to function in removing ionized gas molecules.

This deterioration of the apparatus due to the drastic reduction of metal sputtering is prevented in the apparatus of this invention, however, by the provision of means for "bleeding," or otherwise controllably admitting a non-contaminating gas into the pump volume during operation, preferably at a rate about equal to the rate at which the organic vapors are introduced. The gas so admitted is operative, to prevent the excess deposition of carbonaceous material. Alternatively, if the contaminating carbonaceous material has already deposited so heavily on the particular metal sputtering members of the apparatus so that such sputtering action has practically ceased, the apparatus may be reactivated by controllably admitting a chemically active gas into the apparatus during operation to cause the carbonaceous deposit to be removed thereby restoring the metal sputtering and corresponding ionic pumping action thereof.

Although the chemically active gas may be admitted to the apparatus at almost any desired rate, it should not be admitted so rapidly that the operating pressure exceeds a value which causes its deterioration. Reactivation of the apparatus proceeds more rapidly with increasing rate of chemically active gas admitted, however, operating pressures greater than about $10^{-3}$ millimeters of mercury often cause deterioration of the apparatus due to heating and the like. The preferred rate of chemically active gas admitted, therefore, is often determined by this pressure requirement.

In operation, when a chemically inert gas, such as helium or argon for example, is introduced into the pump volume through valve 22, the formation of the excessive carbonaceous deposit is prevented due to the sputtering effects of the ions thereof impinging upon the cathodes, or other metal sputtering members of the apparatus. For example, the ions of the admitted gas are operative to sputtering metal as well as the depositing carbonaceous material therefrom almost as rapidly as it can be deposited while at the same time not contributing to the deposition of any contaminating carbonaceous material. On the other hand, when a chemically active gas, such as air or oxygen, is admitted to the pump by means of valve 22, the ions and atoms thereof formed in the high voltage discharge, or other gas ionizing means of the pump, react with the depositing carbonaceous material forming volatile gases which form no contaminating carbonaceous deposit but rather are removed by normal pumping action. For example, when air or oxygen is admitted, gases such as carbon dioxide and water are formed by the chemical reaction and are readily removed by action of sputtered metal. Thus, whether the gas admitted to the pump during its operation for removing organic vapors from a vacuum system be chemically active or inert it is operative to prevent excessive deposition of the contaminating carbonaceous material and maintain the metal sputtering action therein in the presence of such organic vapors.

When the contaminating carbonaceous deposit has already formed to such thickness that metal sputtering action of the pump has ceased, however, even the sputtering action of the ions of the admitted chemically inert gas is not sufficient to cause the deposited material to be removed by such action. This is because the deposited carbonaceous material is so difficult to sputter. The already deposited carbonaceous material, however, is still subject to chemical action by ions and atoms of a chemically active gas. For this reason, once the pump has become inoperative due to formation of such a deposit, which prevents metal sputtering action, a chemically active gas must be introduced into the pump through valve 22 and the pump operated until the metal sputtering action therein is restored. For example, the ions and atoms of the chemically active gas, which are formed by the gas ionizing means of the apparatus, react with the deposited material until the deposit is eventually substantially removed and normal ion pumping action of the pump is restored. As described hereinbefore the chemically active gas may be introduced into the pump at any desired rate so long as that rate is not so great that the operating pressure of the pump exceeds a pressure which causes deterioration of the pump.

When reactivating an already inoperative or contaminated apparatus with potentials applied as described hereinbefore and with a chemically active gas controllably admitted to the volume thereof, the deposited material is removed from the cathodes or other metal sputtering members of the apparatus which are maintained at high negative potential with respect to the plasma. It will be understood, however, that such apparatus may be operated in a different mode wherein different electrodes thereof are provided with high negative potentials with respect to the plasma in which case material deposited thereon is similarly removed.

For the operation of devices in accord with the present invention as, for example, the device illustrated in FIGURE 1, it is not necessary that filaments 11 and 12 be utilized. At pressures down to approximately $10^{-8}$ millimeters of mercury, a sufficient number of electrons are created by ionizing collisions of electrons with gas molecules and by the impingement of high energy ions upon the cathodes, causing the emission of secondary electrons, to sustain the discharge between cathodes 2 and 3 on one hand and anode 4 on the other hand. When, however, pressures below $10^{-8}$ millimeters of mercury are reached, under certain circumstances, these processes may not be sufficient to maintain a discharge of sufficient current density to pump at a satisfactory rate. In this instance, it becomes desirable in order to reach lower pressures in a short period of time that an auxiliary source of electrons sufficient to cause ionizing collisions be provided.

Such an auxiliary source of electrons may be provided by energizing either thermionic emitting filaments 11 or 12 by closing either of switches 35 to connect a suitable source of potential, represented generally by batteries 28, across the filament. Either one or both filaments may be energized. Since the area of these filaments is relatively small with respect to the area of cathodes 2 and 3, the filaments have little effect upon the operation of the device other than to provide an auxiliary source of electrons, when needed, to allow the attainment of extremely low pressures as, for example, $10^{-12}$ millimeters of mercury. It will be appreciated, however, that thermionic filaments are not necessary for the operation of the devices.

In FIGURE 2 of the drawing there is illustrated an alternative embodiment of the device of FIGURE 1 wherein a conventional glass or other vitreous envelope structure 29 is utilized rather than the metal and ceramic disc-seal type construction of the device of FIGURE 1.

In FIGURE 2, cathode electrodes 2 and 3 and anode electrode 4 have the same configuration and spatial arrangement as in the device of FIGURE 1. Collector electrode 5', however, comprises a continuous cylindrical member which is in close juxtaposition to both of cathodes 2 and 3, and is substituted for the two collector electrodes 5 and 6 of the device of FIGURE 1. Magnet 24 which may be either an electromagnet or a metallic permanent magnet which slips closely over the glass envelope 29 enclosing the elements, establishes a magnetic field which is substantially normal to the plane of anode 4 and performs the same function as in the device of FIGURE 1. Lead and support members 30 pass through re-entrant portion 31 of envelope 29 as is conventional in glass electron discharge devices. A breakdown shield 32 is built up upon each of members 30 to prevent electrical breakdown occurring from the point at which these members enter into re-entrant glass porton 31 of envelope 29.

A tubulation is provided near one end of envelope 29 having a T-section provided thereon. As shown in FIGURE 1 the T-section includes one portion 19 connected through envelope 29 to the pump volume and another portion 20 adapted for connection to the system being evacuated. The remaining portion 21 of the T-section includes valve means 22, or other means for controllably admitting a selected noncontaminating gas into the pump volume. As described hereinbefore with reference to the embodiment shown in FIGURE 1 the portion 23 extending from the valve means 22 may terminate to the atmosphere for controllably admitting air into the pump, or may be connected to a source of a selected noncontaminating gas, such as oxygen, nitrogen or a noble gas, for controllably admitting such selected gas into the pump.

The apparatus of FIGURE 2 is connected in circuit identically as is the apparatus of FIGURE 1 and functions substantially the same in removing organic vapors from low pressure vacuum systems. When enclosing the operative elements within the single envelope 29 of vitreous material, such as glass, rather than a composite ceramic-metal envelope, the collector electrode may be a single cylindrical member, as illustrated at 5', rather than the pair of collector electrodes 5 and 6 as illustrated in FIGURE 1.

From the foregoing description it is clear that there may be wide variations in design and configuration of apparatus to which the principles of this invention are applicable and of which invention the embodiments shown in FIGURES 1 and 2 are exemplary only. Since this invention provides means for pumping organic vapors by maintaining the metal sputtering action within the apparatus in the continued presence of organic vapors, it is applicable to any such ionic pumping apparatus which depends upon the removal of ionized gas molecules by sputtered metal either wholly, partially, directly or indirectly. The method of this invention, therefore, may be practiced with any such ionic pumping apparatus utilizing the mechanism of removal of ionized gas molecules by sputtered metal.

While the invention has been described in detail herein with reference to specific apparatus embodiments, many modifications and changes will readily occur to those skilled in the art. Accordingly, the appended claims are intended to cover all such changes and modifications as fall within the true spirit and scope of the invention.

What I claim as new and desire to secure by Letters Patent of the United States is:

1. Apparatus for lowering the pressure of organic vapor containing systems comprising: an ionic pump including means for introducing gas molecules within the volume thereof, means for ionizing gas molecules, a source of sputterable metal and means for removing ionized gas molecules by action of sputtered metal therein; and means for controllably admitting a noncontaminating gas into the pump volume in an amount sufficient to maintain said source of sputterable metal free of carbonaceous deposits when said first-named means is connected to a system containing organic vapors.

2. The apparatus of claim 1 wherein said non-contaminating gas is selected from the group consisting of air, oxygen, nitrogen and the noble gases.

3. The apparatus of claim 1 wherein said non-contaminating gas is air.

4. The apparatus of claim 1 wherein said non-contaminating gas is oxygen.

5. Apparatus for removing organic vapors from low pressure vacuum systems comprising: an ionic pump including means for introducing gas molecules within the volume thereof, means for ionizing the gas molecules, a source of sputterable metal and means for removing ionized gas molecules by action of sputtered metal therein; and valve means operatively connected to said ionic pump for controllably admitting a noncontaminating gas into the pump volume in an amount sufficient to maintain said source of sputterable metal free of carbonaceous deposits when said first-named means is connected to a system containing organic vapors.

6. Apparatus for removing organic vapors from low pressure vacuum systems comprising: an ionic pump including means for introducing gas molecules within the volume thereof, means for ionizing the gas molecules, a source of sputterable metal and means for removing ionized gas molecules by action of sputtered metal therein; means for connecting the volume of said pump with the volume of an organic vapor containing system to be evacuated; and means operatively connected with said last mentioned connecting means for controllably admitting a noncontaminating gas to said pump volume, said non-contaminating gas being introduced into said pump volume at approximately the same location as the organic vapors from the system being evacuated, said non-contaminating gas being introduced in an amount sufficient to maintain said source of sputterable metal free of carbonaceous deposits when said first-named means is connected to a system containing organic vapors.

7. The method of restoring the ion pumping action of ionic pumping apparatus which has become substantially ineffective in removing ionized gas molecules as a result of its continued operation in an organic vapor containing atmosphere comprising: initiating operation of said apparatus; introducing a chemically active gas into the volume of said apparatus during such operation; controlling the flow of said chemically active gas into the ionic pumping apparatus so that the pressure thereof does not exceed about $10^{-3}$ millimeters of mercury; and continuing the operation of said apparatus in the presence of said chemically active gas until substantially complete metallic sputtering action has been restored therein.

8. The method of reactivating ionic pumping apparatus which has deteriorated due to excessive deposition of carbonaceous material on the metal sputtering members thereof caused by operation in an organic vapor containing atmosphere so that the production of sputtered metal within said apparatus has substantially ceased which comprises: initiating operation of the ionic pumping apparatus so that gas molecules within the volume thereof are caused to be ionized and the ionized gas molecules accelerated toward said metal sputtering members; controllably admitting a chemically active gas into the volume of said apparatus during such operation and maintaining the pressure within said apparatus at a value no greater than about $10^{-3}$ millimeters of mercury; causing the ionization of said chemically active gas molecules within the volume of said apparatus; and reacting the ionized molecules and atoms of said chemically active gas with said deposited carbonaceous material within said apparatus so that said material is removed from said metal sputtering members and the metal sputtering action of said apparatus is restored.

9. The apparatus of claim 1 wherein said non-contaminating gas is selected from the group consisting of the noble gases.

10. The apparatus of claim 1 wherein said last-mentioned means comprises a fixed orifice of predetermined size.

References Cited in the file of this patent
UNITED STATES PATENTS
2,858,972   Gurewitsch _____ Nov. 4, 1958